(12) United States Patent
Tschirhart et al.

(10) Patent No.: US 6,178,438 B1
(45) Date of Patent: Jan. 23, 2001

(54) SERVICE MANAGEMENT SYSTEM FOR AN ADVANCED INTELLIGENT NETWORK

(75) Inventors: David A. Tschirhart, Celina; Keith F. Deacon; Marc Gauthier, both of Plano, all of TX (US)

(73) Assignee: Alcatel USA Sourcing, L.P., Plano, TX (US)

( * ) Notice: Under 35 U.S.C. 154(b), the term of this patent shall be extended for 0 days.

(21) Appl. No.: 08/993,433

(22) Filed: Dec. 18, 1997

(51) Int. Cl.$^7$ .............................. G06F 15/16; G06F 15/17
(52) U.S. Cl. .................. 709/200; 709/218; 704/270; 379/88.25; 379/221; 379/89; 379/201
(58) Field of Search .................... 709/200, 218; 704/270; 379/88.25, 221

(56) References Cited

U.S. PATENT DOCUMENTS

| | | | |
|---|---|---|---|
| 5,513,250 | * 4/1996 | McAllister | 379/91 |
| 5,579,384 | 11/1996 | Seymour | 379/243 |
| 5,583,920 | * 12/1996 | Wheeler, Jr. | 379/88 |
| 5,594,789 | * 1/1997 | Seaholtz et al. | 379/207 |
| 5,655,007 | * 8/1997 | McAllister | 379/91.01 |
| 5,712,903 | * 1/1998 | Bartholomew et al. | 379/88.25 |
| 5,729,598 | * 3/1998 | Kay | 379/115 |
| 5,933,490 | * 8/1999 | White et al. | 379/221 |

OTHER PUBLICATIONS

Carol Wilson, "CO products develop new revenue opportunities", Telephony, Apr. 9, 1990.*
G. Bogler, et al., "TMN in the Internet Age: Network Management by Multiparty Cooperation", ISS '97 World Telecommunications Congress, Sep. 21–26, 1997, pp. 603–609.
H. Wang, et al., "Development of an Open Service Management System Architecture", ISS '97 World Telecommunications Congress, Sep. 21–26, 1997, pp. 285–293.

* cited by examiner

Primary Examiner—Mark H. Rinehart
Assistant Examiner—Ivan C. Pierce, III
(74) Attorney, Agent, or Firm—Baker Botts L.L.P.

(57) ABSTRACT

An service management system for an advanced intelligent network includes a plurality of gateways in communications with a plurality of network nodes and service clients which may issue service requests. The service requests are received by the gateways, which convert the service requests to orders having a predetermined format containing the service requests. An order distribution server in communication with the plurality of gateways receives and distributes the orders. A plurality of management programs receive the orders from the order distribution server and execute the service requests contained in the orders. Responses may be generated by the management programs and sent to the order distribution server for delivery to the network nodes and service clients.

15 Claims, 10 Drawing Sheets

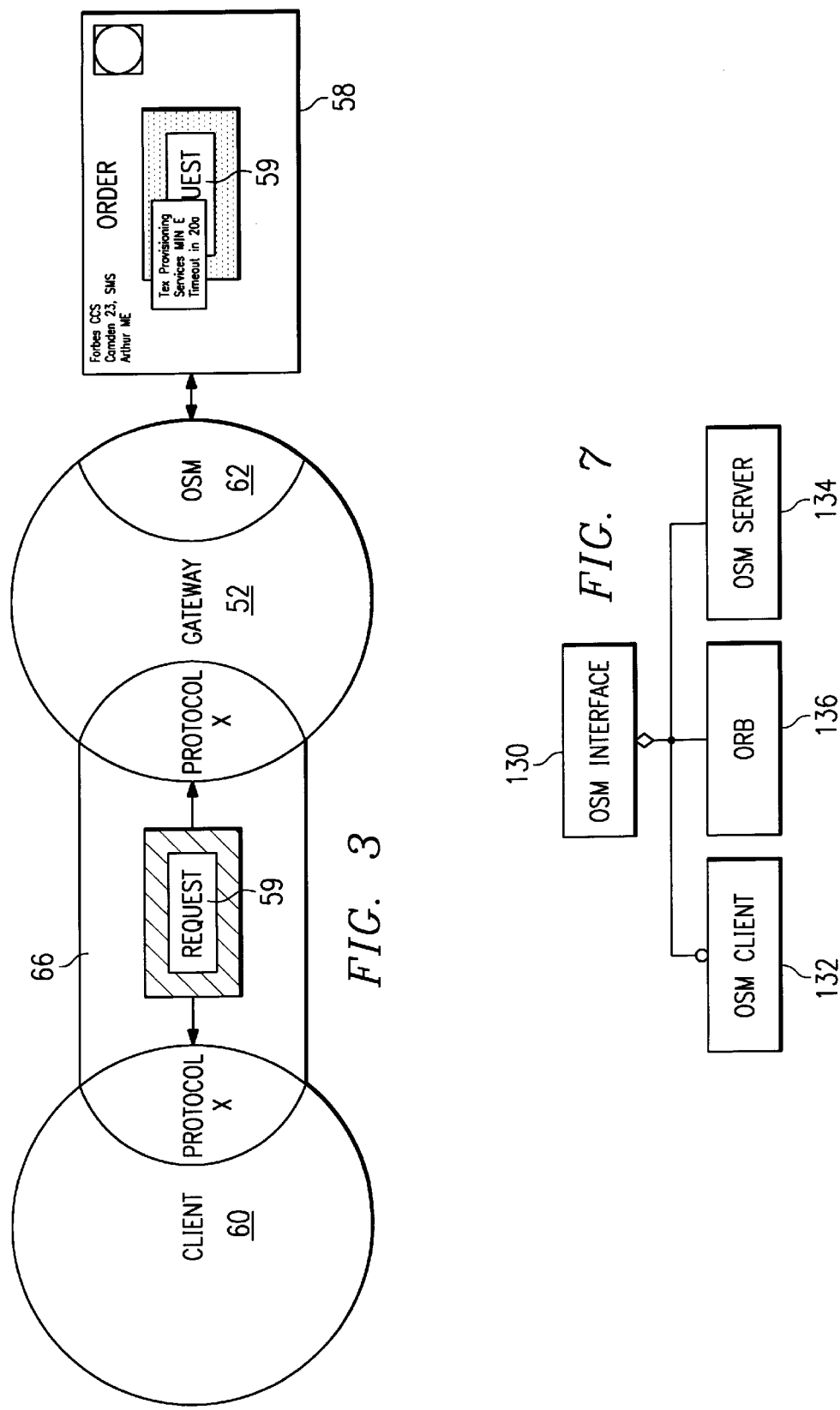

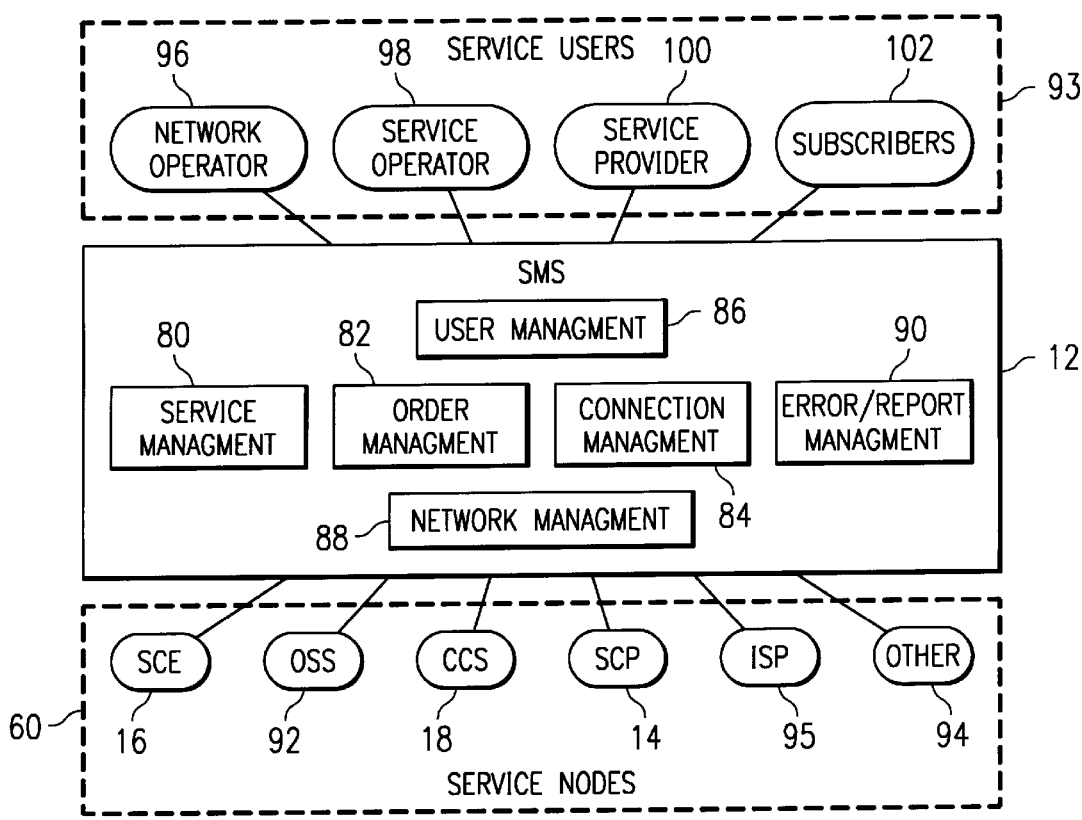
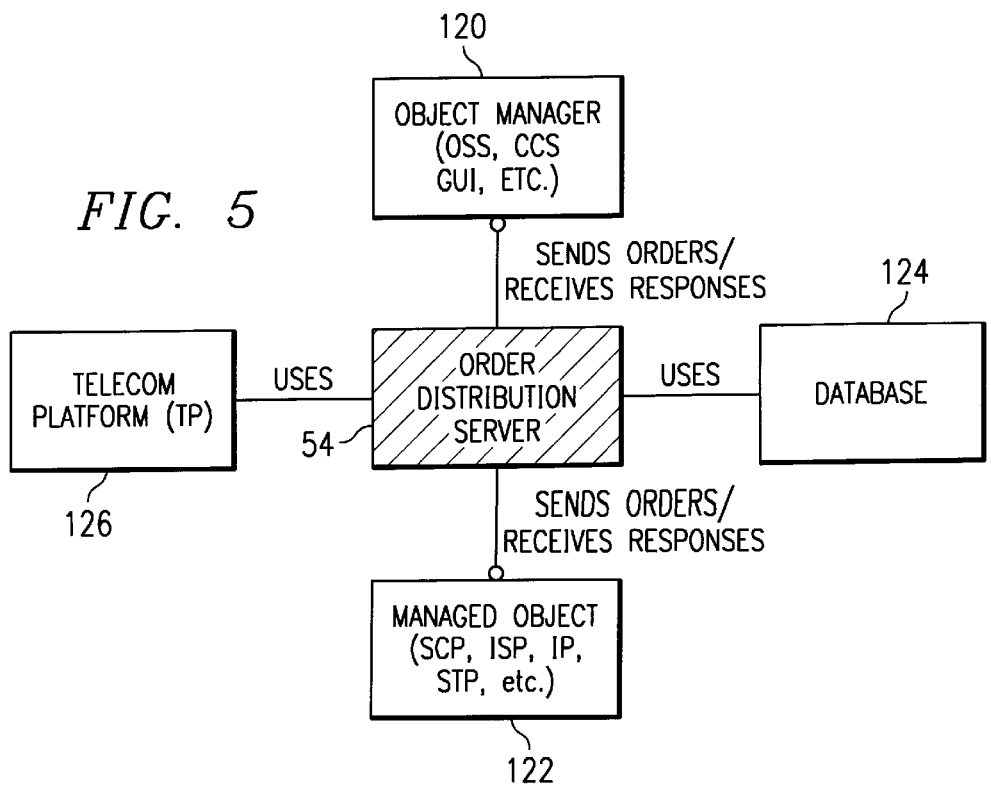

SERVICE MANAGEMENT SYSTEM FOR AN ADVANCED INTELLIGENT NETWORK

TECHNICAL FIELD OF THE INVENTION

This invention is related in general to the field of telecommunications. More particularly, the invention is related to a service management system (SMS) architecture for an advanced intelligent network (AIN).

BACKGROUND OF THE INVENTION

With the advent of the advanced intelligent network (AIN), it has become possible to rapidly design and introduce many new enhanced telecommunications services that provide added flexibility and convenience in how we use our telephone equipment.

The service logic programs and database schema implementing these new services are typically designed at the service creation environment (SCE). The service creation environment is coupled to a service management system (SMS) which supports the operations, administrations, management, and provisioning (OAM&P) needs of the network. The advanced intelligent network nodes typically includes switches or service switching points (SSPs) coupled to signal transfer points (STPs), which are in turn coupled to service control points (SCPs). The service management system functions as an interface between the service creation environment and the rest of the network nodes as it disseminates the service logic programs and database schema to network nodes for execution. The service control points executes service logic programs which define the services and further store and maintain databases that have data associated with the services. The advanced intelligent network further includes intelligent peripherals, which provide pre-recorded voice announcements, voice synthesis, and other functionalities that generally facilitate interaction with service subscribers and customers. The service management system must also interface with customer care systems to provision services that have been deployed.

Therefore the service management system may be thought of as a peer client management system. The service management system accepts and submit requests to and from clients (network nodes) and manage the information flow between all clients. However, not all the clients or network nodes communicate via the same protocol. Further, because the customer care systems do not operate under any industry standard, the service management system must be able to support various dissimilar client connections.

SUMMARY OF THE INVENTION

Accordingly, there is a need for a service management system for the advanced intelligent network that is able to support and communicate with network nodes that operate with dissimilar communications protocols.

In an aspect of the invention, an service management system for an advanced intelligent network includes a plurality of gateways in communications with a plurality of network nodes and service clients which may issue service requests. The service requests are received by the gateways, which convert the service requests to orders having a predetermined format containing the service requests. An order distribution server in communication with the plurality of gateways receives and distributes the orders. A plurality of management programs receive the orders from the order distribution server and execute the service requests contained in the orders. Responses may be generated by the management programs and sent to the order distribution server for delivery to the network nodes and service clients.

BRIEF DESCRIPTION OF THE DRAWINGS

For a better understanding of the present invention, reference may be made to the accompanying drawings, in which:

FIG. 3 is a simplified block diagram illustrating the relationship between requests and orders according to the teachings of the present invention;

FIG. 4 is a simplified functional diagram of an embodiment of service management system according to the teachings of the present invention;

FIG. 5 is a simplified context diagram of an embodiment of the order distribution server (ODS) according to the teachings of the present invention;

FIG. 7 is an object model diagram of an embodiment of the open server management (OSM) interface according to the teachings of the present invention;

DETAILED DESCRIPTION OF THE INVENTION

Figure 1:
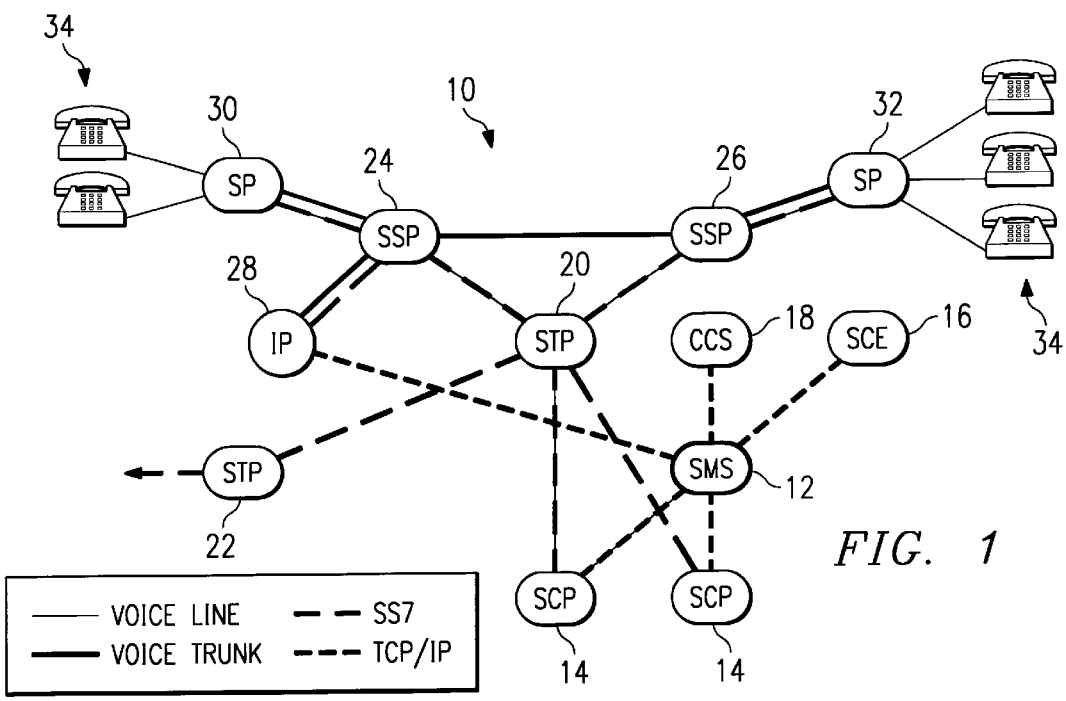
FIG. 1 is a simplified block diagram of an advanced intelligent network (AIN)

The preferred embodiments of the present invention are illustrated in FIGS. 1–18, like reference numerals being used to refer to like and corresponding parts of the various drawings.

Referring to FIG. 1, a simplified block diagram of an exemplary advanced intelligent network (AIN) 10 is shown. Network 10 includes a service management system (SMS) 12 which interfaces with service control points (SCP) 14, service creation environment (SCE) 16 and a customer care system (CCS) 18 via industry standard protocols such as X.25 and TCP/IP. Service management system 12 provides network information, database management, and administrative support for network 10. Service management system 12 receives service logic programs (SLPs) and database schema from service creation environment 16 and disseminates them to the rest of the network for service deployment and execution. Service management system 12 generally interfaces with service control point 14 for provisioning, database management, service control point application program management, and collecting traffic metering and measurement data. Service management system 12 is further linked to customer care systems 18 to provide provisioning and support of deployed services.

Service control points 14 are also linked to a signal transfer point (STP) 20 via SS7 (signaling system number 7) link sets. Signal transfer point 20 may also be coupled to its mated signal transfer point 22 via the SS7 protocol. Signal transfer point 20 is further coupled to one or more service switching points (SSPs) 24 and 26, via SS7 link sets, which perform the switching and call handling functions in the network. An intelligent peripheral (IP) or intelligent service peripheral (ISP) 28 is coupled to service switching point 24 and service management system 12. Intelligent peripheral 28 provides an interface to callers and service subscribers and plays pre-recorded or voice synthesized announcements and prompts. Service switching points 24 and 26 are part of the public switched telephone network (PSTN) and are coupled to signaling points 30 and 32, respectively, which are further coupled to customer premises equipment (CPE) 34 of telephone service subscribers.

It may be seen that service management system 12 occupies a crucial role in facilitating the rapid commissioning of new services. Service management system 12 interfaces with service creation environment 16 to receive service logics developed therein; it interfaces with service control points 14, intelligent peripherals 28, and other network nodes for service deployment; and it interfaces with customer care systems 18 to provide provisioning of the deployed services.

Figure 2:
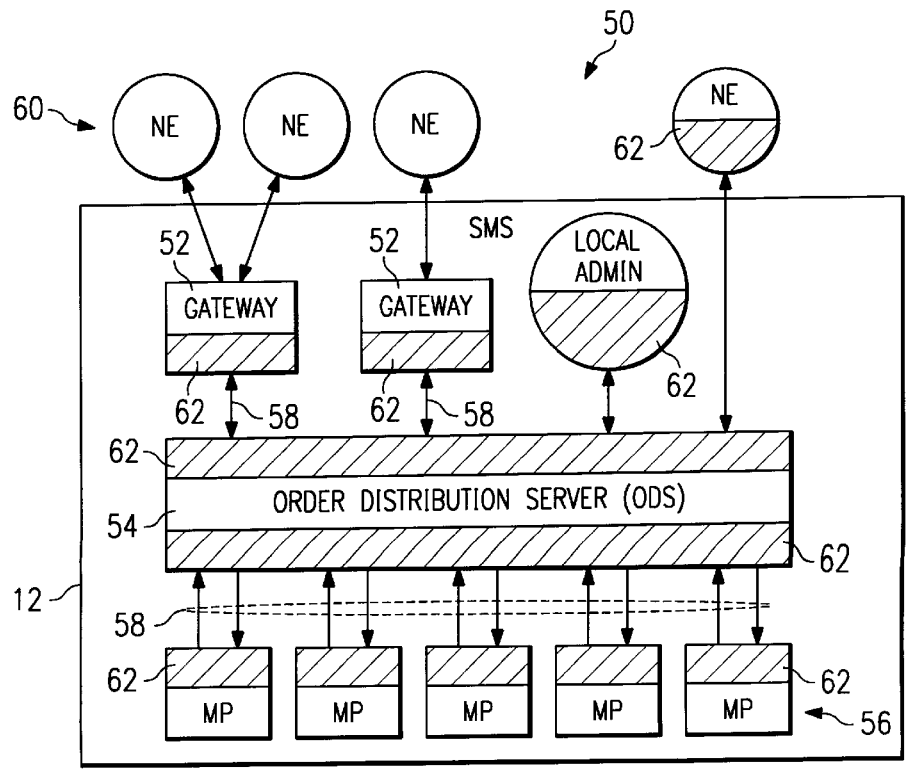
FIG. 2 is a simplified block diagram of an embodiment of service management system (SMS) components according to the teachings of the present invention.

Referring to FIG. 2, a simplified diagram of the service management system architecture 50 according to the teachings of the present invention is shown. Service management system architecture 50 includes three main components: gateways 52, an order distribution server (ODS) 54, and management programs (MP) 56. Gateways 52, order distribution server 54, and management programs 56 all communicate via the same protocol—order 58. Referring also to FIG. 3, orders 58 encapsulates a request 59 and its state, result, ownership, status, time limitations, and other overhead information. An order 58 thus contains a request 59 and all the necessary information needed to process the request. The gateways' role is to accept and translate from various dissimilar client protocols 66 used by network nodes 60 to the internally defined order protocol and back. Gateways 52 also authenticates the clients 60 for security purposes. An open service management (OSM) 62 access interface is employed between gateways 52, order distribution server 54, and management programs 56. The role of order distribution server 54 is to deliver orders 58 between gateways 52 and management programs 56. In many ways, order distribution server 54 functions like the postal service, which delivers and picks up mail from postal customers. Management programs 56 process the requests contained in orders 58. The execution of management programs 56 in processing requests fulfill the various functions of service management system 12.

FIG. 4 is a simplified functional diagram of service management system 12. Service management system functionality may be partitioned into six distinct groups: service management 80, order management 82, connection management 84, user management 86, network management 88, and error/report management 90. These functional groups process requests form service nodes 60, which may include service creation environment 16, operation support system (OSS) 92, customer care system 18, service control point 14, intelligent service peripheral 95, and other nodes 94. These functional groups also process requests from service users 93, such as network operators 96, service operators 98, service providers 100, and subscribers 102.

The function of service management 80 of service management system 12 involves the deployment, activation, versioning, provisioning, and monitoring of services and management programs. The service management functions of service management system 12 are carried out by management programs 56. Order management 82 of service management system 12 encompasses all activities pertaining to the creation, identification, composition, submission, propagation, tracking, deletion, and special treatment of orders. Order management is performed by order distribution server 54. Connection management 84 encompasses all activities that pertain to establishing, dropping, and logging connections from service users 93 and service nodes 60 to service management system 12. User management 86 is concerned with providing controlled access to the various resources and programs offered by service management system 12. Thus, user management 86 enforces security measures that authenticate clients and prevent unauthorized access to service management system 12. Network management 88 is concerned with maintaining information about the network nodes (service control point, intelligent peripheral, etc.) that are managed by service management system 12 and allowing authorized users and programs to access this information. Network management programs allow authorized users to perform network node administration. Error and report management 90 is concerned with the reporting and logging of information and problems. For example, information and problem reports (IPRs) are generated and transactions submitted to service management system 12 are recorded into transaction logs.

The order management functionality of service management system 12 encompasses all activities that pertain to the creation, identification, composition, submission, propagation, tracking, deletion and special treatment of orders. Orders are managed by order distribution server 54, which is described in more detail below. An order is created by allocating memory to an instance of osmOrder class. Each order is assigned a unique identifier, which is used to correlate actions, events, and results with the order. Each order invokes a specific service management program (SMP) in service management system 12. The particular program is specified by a program key and an optional service version. When a service version is not specified, the latest version of the service management program is invoked. In addition to identifying the service management program, the order also pass all required arguments to the service management program.

Referring to FIG. 5, a context diagram for order distribution server 54 is shown. Order distribution server 54 dispatches orders and associated responses to their specified destinations. Order distribution server 54 provides an open service management interface which allows object managers (OMs) 120 such as operation support systems, customer care systems, and graphical user interfaces (GUIs) to send orders to and receive responses from managed objects (MOs), such as service control points 14, intelligent service peripherals, intelligent peripherals, and signal transfer points 20. All orders and responses received by order distribution server 54 also use databases 124 to store and retrieve information pertaining to services, user registration, node registration, connections, and sessions. Further, order distribution server 54 uses a telecom platform 126, which is a software system designed to support the development and execution of distributed, fault-resilient telecommunications applications. Telecom platform 126 may include an object request broker (ORB) agent, a distributed object management environment for interprocess communications, an event manager that coordinates and distributes events according to interest registered by processes, and a service manager that provides process level control for application processes. Therefore, telecom platform 126 furnishes some of the basic underlying functions used by service management system 12.

Figure 6:
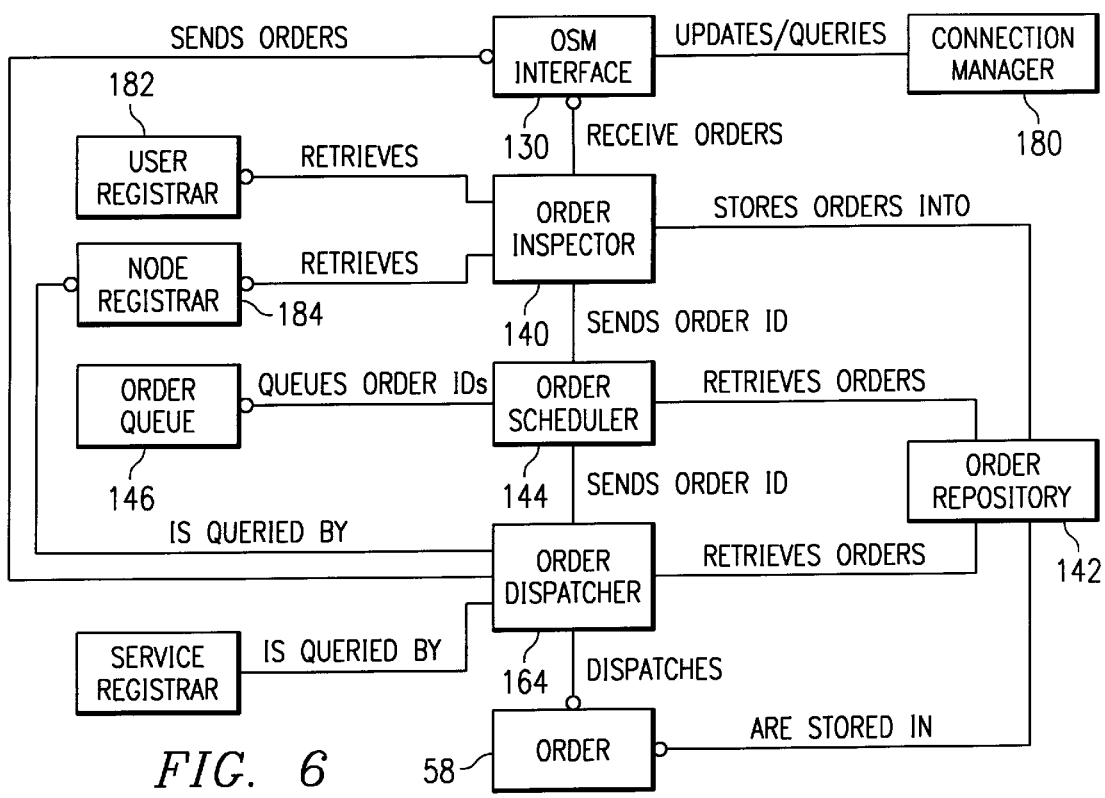
FIG. 6 is an object model diagram of an embodiment the order distribution server according to the teachings of the present invention.

Referring to FIG. 6, an object model of order distribution server 54 is shown. Order distribution server object includes 11 subcomponents, including an OSM interface 130. FIG. 7 is an object model of OSM interface 130. OSM client 132 is the base class for various managed objects and object managers. OSM server 134 implements the entry point of orders into service management system 12. OSM server 134 is multi-threaded to process orders in a concurrent non-blocking manner. OSM clients 132 and OSM server 134 communicate through object request broker (ORB) 136.

Figure 8:
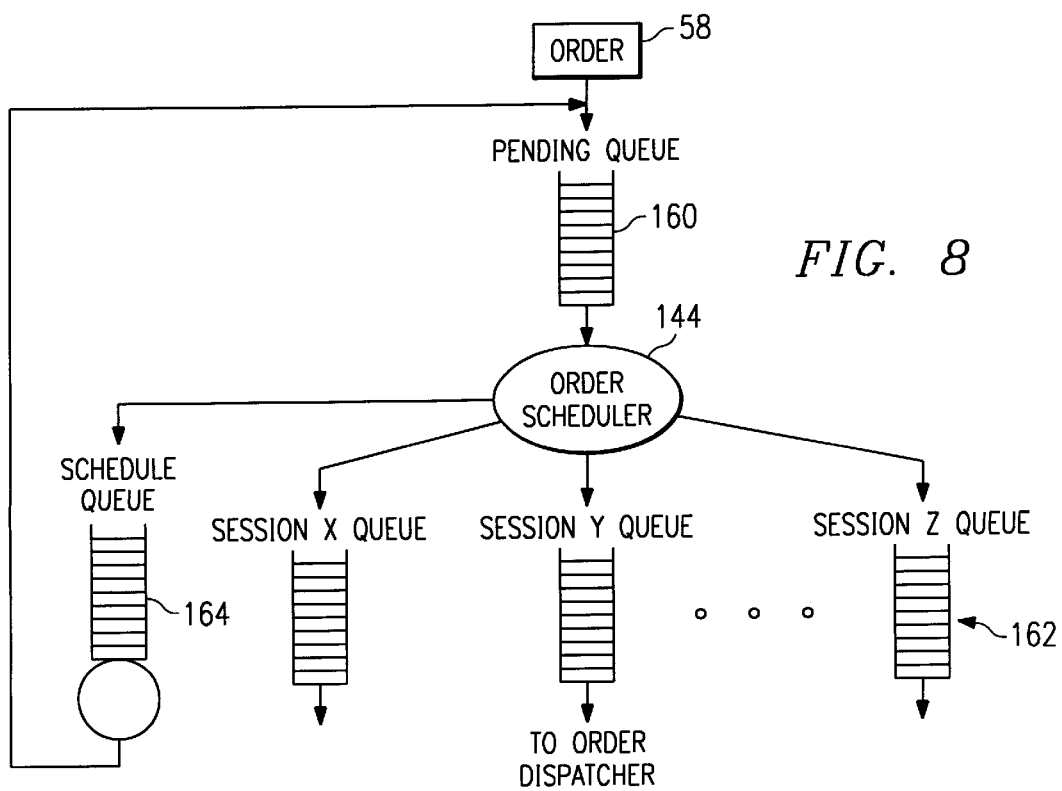
FIG. 8 is a simplified functional block diagram of an embodiment of the order scheduler according to the teachings of the present invention.

Returning to FIG. 6, An order inspector 140 receives orders from OSM interface 130. Order inspector 140 is responsible for enforcing security measures such as authenticating the clients who communicate with service management system 12. Order inspector 140 may examine each order against a set of acceptance criteria, and only those orders that pass are stored in a database. An order repository 142 is responsible for storing the valid orders into the database and also retrieving the orders from the database upon request. The orders retrieved by order repository 142 are passed to an order scheduler 144. Order scheduler 144 ensures that orders are executed at the appropriate time and in the correct sequence. Order scheduler 144 maintains a set of order queues 146 which are used to sort orders according to the scheduled time, sessions, and priorities. For example, as shown in FIG. 8, order 58 retrieved by order repository 142 is put into a pending queue 160. Order scheduler 144 retrieves the orders from pending queue 160 and organizes them according to scheduled time, sessions, and priorities, and forwards the orders to one or more session queues 162 (which are instances of a class which may be derived from order queue 146) according to the session designation in each order, so that orders belonging to the same session are entered into the same session queue. An order dispatcher 164 retrieves the orders from session queues 162 and forwards the orders to the appropriate destination according to the destination address of each order. Order scheduler 144 may also retrieve the orders from pending queue 160 and forward them to a schedule queue 164, which may be used to temporarily hold the orders until they are ripe for execution. Order dispatcher 164 obtains orders from session queues 162 according to session priority. Orders from higher priority sessions are dispatched before orders from lower priority sessions.

Figure 9:
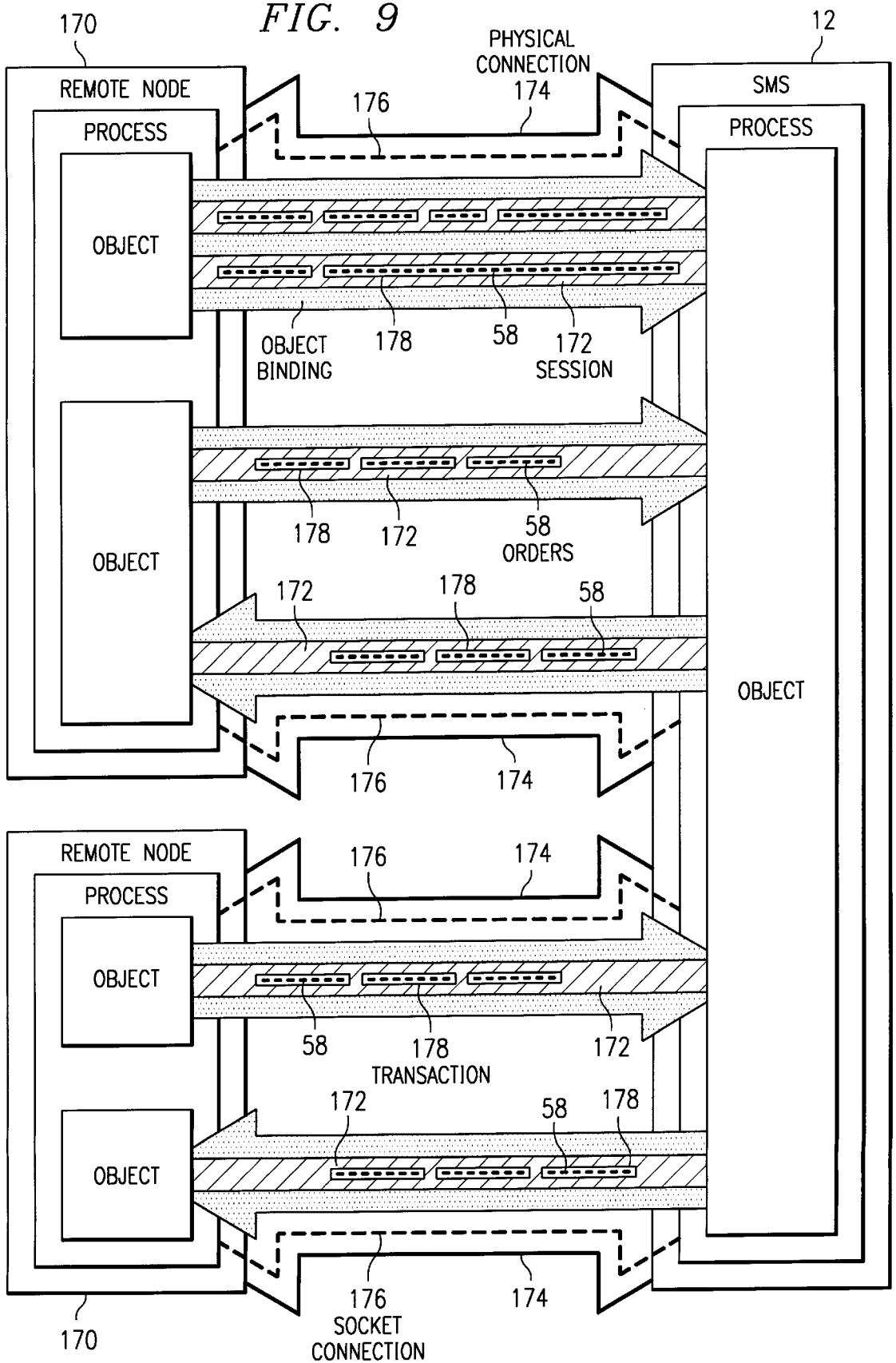
FIG. 9 is a simplified functional block diagram of an embodiment of node to service management system connections according to the teachings of the present invention.

Returning to FIG. 6, a connection manager 180 controls the use of connections via OSM interface 130. In FIG. 9, a block diagram illustrating connection management is shown. Service management system 12 and remote nodes 170, as well as components internal to service management system 12, communicate by exchanging orders 58 and responses. Multiple sessions 172 can be active within a single physical connection 174 and socket connection 176, and multiple connections can be opened from the same or different nodes. Each session is limited to one outstanding transaction 178 that may include multiple orders 58. Service management system 12 provides a connection oriented interface to service users 93 and service nodes 60. A connection is established between the service user or node 170 and service management system 12 before they can exchange information. The node that establishes the connection is called an originator, the node that accepts the connection is called a terminator. Typically, service clients establish connections with service management system 12, and service management system 12 establishes the connections with the service nodes. Each node may be limited to a maximum number of active connections to service management system 12, which is configurable when the node registers with service management system 12. Each service user may be also limited to a maximum number of active connections to service management system 12. The maximum number is configured when the service user registers with service management system 12. Connections are typically dropped by the originator once they are no longer needed. If the termination drops a connection, an exception is thrown to notify the originator. Even after a connection is dropped, stand-alone orders that have been submitted by the originator and successfully received by service management system 12 continue to execute. If submitted orders are part of an outstanding transaction, the transaction is rolled back. Service management system 12 may also drop a connection that has been idle for a predetermined amount of time. Upon connection time out, the originator is notified by a thrown exception.

Session management pertains to activities that have to do with starting, identifying, suspending, and ending of sessions. Once a connection is established, the originator informs service management system 12 that it wishes to start a session. Upon starting a session, the originator provides a number of context attributes, such as priority and schedule, that applies to all the orders submitted within that session. The same originator may start multiple sessions with service management system 12 using the same connection. The maximum number of sessions that an originator may have is configurable upon registration of the service user. A different context may be specified for each session. Multiple transactions may also be performed sequentially using the same session. However, a single transaction cannot span across multiple sessions and a given session cannot have more than one transaction active at any point in time. At the end of a session, any outstanding transaction is rolled back.

As shown in FIG. 6, a user registrar 182 provides access to user registration information to order inspector 140, and a node registrar 184 provides access to node registration information to order inspector 140, so that order inspector 140 may perform client authentication and other security functions.

Figure 10:
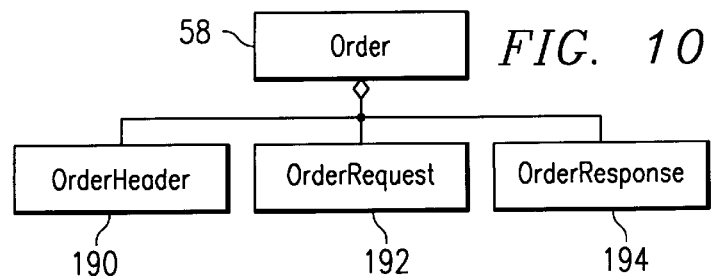
FIG. 10 is an object model diagram of an embodiment of the order object according to the teachings of the present invention.

Referring to FIG. 10, an object model for an order 58 is shown. An order includes three major components: a header (OrderHeader) 190, a data section for the request (OrderRequest) 192, and a data section for the response (OrderResponse) 194. An order header 190 contains information which is common to all orders. It identifies the originator and destination of the order, its author and purpose, tracks the progress and state of the order as it flows through the system, and keeps timing information for throughput analysis.

Figure 11:
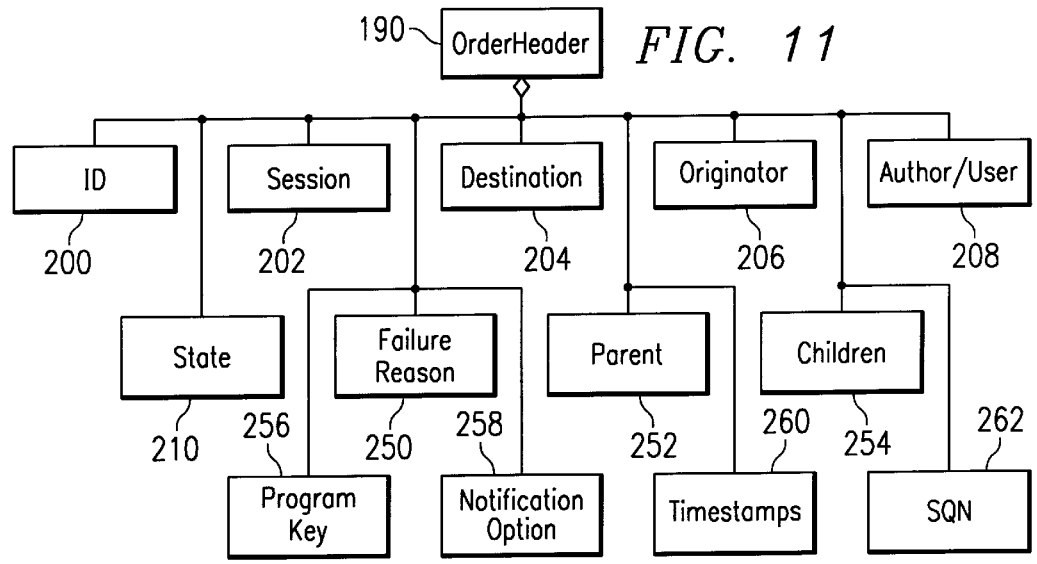
FIG. 11 is an object model diagram of an embodiment of the order header object according to the teachings of the present invention.
Figure 12:
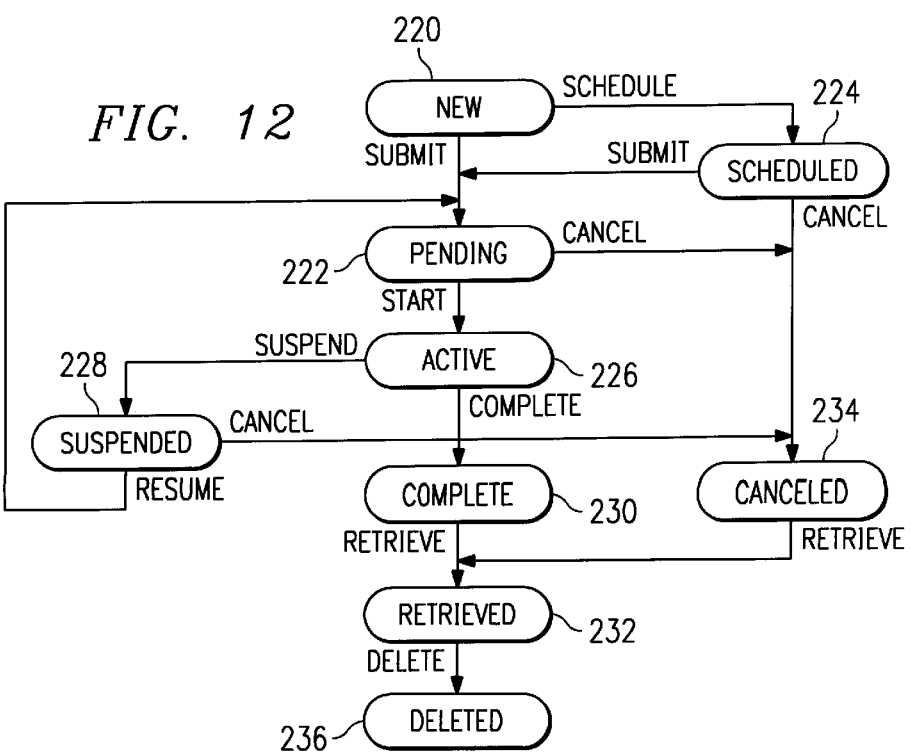
FIG. 12 is a state diagram of orders according to the teachings of the present invention.

FIG. 11 shows an object model for OrderHeader 190, which includes object classes for the fields of the order header. ID 200 is an identifier assigned to the order by its author before the order is submitted to service management system 12. The combination of ID and author uniquely identifies each order within service management system 12. Session 202 identifies groups of orders that must be processed in sequence. The session field is set by service management system 12 when receiving each order based on the session handle passed by the originator upon submission. Destination 204 specifies the recipient of the order and is used by order dispatcher 164 for delivery. Upon receiving an order, an application may generate one or more child orders targeting multiple destinations. This allows a management program to replicate an order across several nodes. Originator 206 is a field that specifies the node from which the order was submitted. Author/user 208 specifies the name of the service user that created the order. State 210 indicates the progress of the order. FIG. 12 is an order state diagram. An order in new state 220 indicates that the order has been created by the service user but not yet submitted to service management system 12. Service management system 12 is therefore unaware of orders in this state. A pending order in pending state 222 indicates that the order has been submitted to service management system 12 but it has not yet started executing. A scheduled order in scheduled state 224 indicates that the order has been submitted to service management system 12 and is queued for execution at the scheduled time and date. Active state 226 indicates the order is currently being executed by service management system 12. A suspended order in suspended state 228 indicates that the execution of the order has been halted temporarily. An order in complete state 230 is one that has been executed and the execution completed. Retrieved state 232 indicates that the service user has received the results associated with the execution of the order. An order immediately progresses from complete to retrieved if service user has indicated that no interest in receiving the result. Canceled state 234 indicates that the service user has canceled the execution of the order. However, not all orders may be canceled. An deleted order (deleted state 236) and its associated results have been deleted. The default setting is to delete an order and the result immediately after the service user has had the chance to retrieve the result. FIG. 12 illustrates how an order may advance from one state to the next in response to certain actions or occurrences.

Returning to FIG. 11, order header 190 may also include a failure reason field 250, which provides information on the cause of failure, if applicable. A parent field 252 identifies a previous order responsible for the creation of the current order. Applications may use this field to trace back the cause-effect relationship of orders. Upon receiving an order that specifies a parent, service management system 12 adds the ID of this order to the list of child orders 254 of its parent. A program key 256 identifies a particular management program, which is set by the originator before the order is submitted. Notification option 258 is a field that contains a flag indicative of the type of notification that is expected by the originator: no notification regarding the execution state of child orders, partial notification that some child orders may still be pending or executing, and full notification that all child orders have completed. Timestamps 260 record the times of specific events to the order, such as submission, completion, and modification.

An order 58 also includes order request 192 that specifies the command and arguments to be executed by the recipient of the order. Once submitted, the order request may not be changed. Order distribution server 54 does not validate the order request unless it is the intended recipient of the order. The order request is regarded as the content of the message and may contain any data that the author wants to include. It is the responsibility of the recipient to interpret the request and reject it if its content cannot be understood. Order response 194 is a field that contains all results associated with the request.

Figure 13:
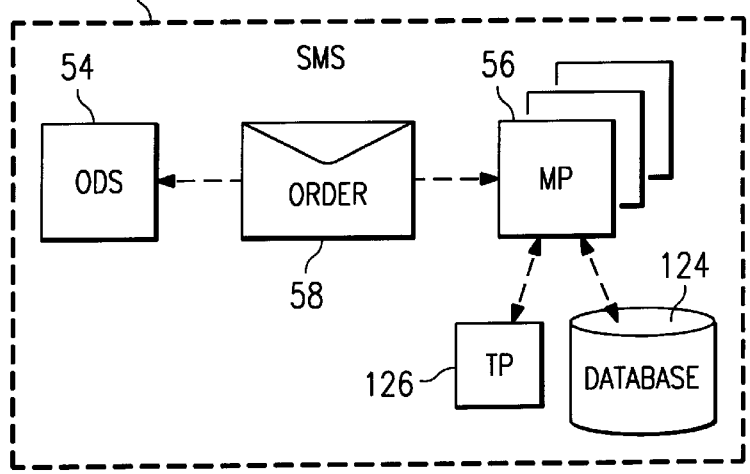
FIG. 13 is a context diagram of an embodiment of management programs according to the teachings of the present invention.

FIG. 13 is a context diagram of management programs 56 of service management system 12. Management programs 56 may be classified into two main groups: service management programs and rigid management programs. Service management programs are dynamic and driven by service logic programs and/or the service logic interpreter used to interpret the service logic programs. Service management programs are generally formulated in the service creation environment to facilitate the customization of service management system behavior. Rigid management programs, on the other hand, are static and data-driven programs that are not overridden by service logic designed in the service creation environment. Each management program 56 is connected to order distribution server 54. Once it is initialized, a management program registers for the class of orders (service or rigid management program) for which it was configured. As orders 58 are retrieved from order distribution server 54, management programs 56 execute on the requested operations. Each management program 56 may access a database 124 as needed to fulfil orders and to obtain configuration information. Additionally, each management program 56 supplies an interface to a service manager (not shown) of telecom platform 126 via a service management interface (not shown). This allows management programs 56 to communicate initialization status, administration state, heartbeat responses, audit responses, and termination requests with the service manager.

Figure 14:
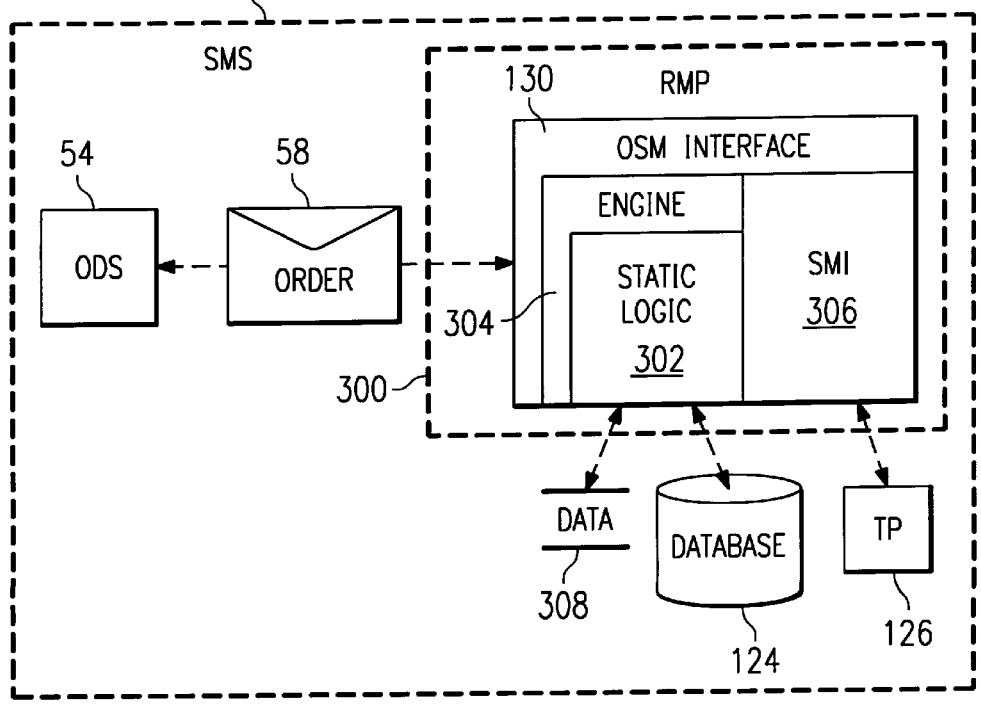
FIG. 14 is a context diagram of an embodiment of rigid management programs according to the teachings of the present invention.

FIG. 14 is a block diagram of a rigid management program 300. Rigid management programs 300 include a static logic portion 302 which is driven by an engine 304 and a service management interface (SMI) 306. Communications to order distribution server 54 is handled via OSM interface 130. Since rigid management programs have static logic, they cannot be changed by a service creation environment management logic program (not shown). As orders 58 are retrieved from order distribution server 54, rigid management programs may execute logic which is driven by a data source 308 and/or by configuration parameters stored in database 124.

Figure 15:
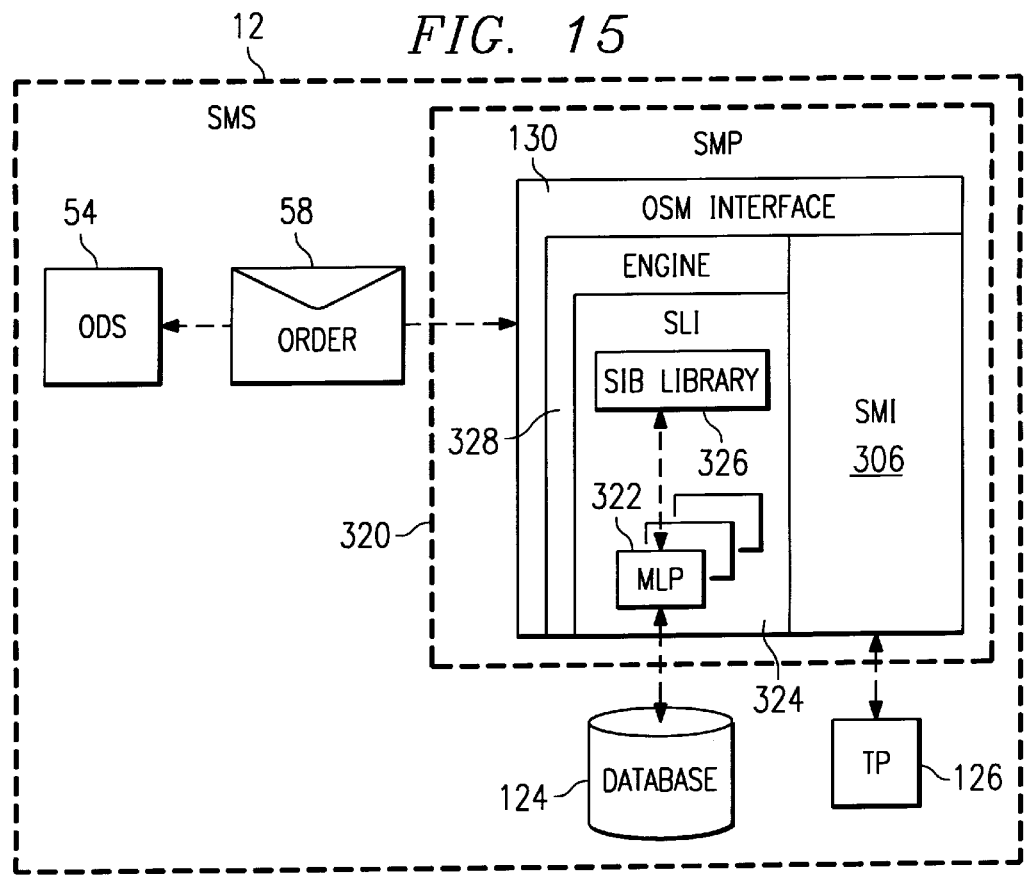
FIG. 15 is a context diagram of an embodiment of service management programs according to the teachings of the present invention.

Referring to FIG. 15, service management programs 320 includes a dynamic logic portion which is supplied by the service creation environment in the form of a management logic program (MLP) 322, a service logic interpreter 324, a SIB (service independent block) library 326, an engine 328 to drive service logic interpreter 324, and a service management interface 306. Communication to order distribution server is handled via OSM interface 130. Since service management programs 320 have dynamic logic, they can be overridden by a management logic program 322. As orders are retrieved from order distribution server 54 by engine 328, the requests are sent to service logic interpreter 324 for processing. There can be several orders in the active state within a given service management program's service logic interpreter 324.

Figure 16:
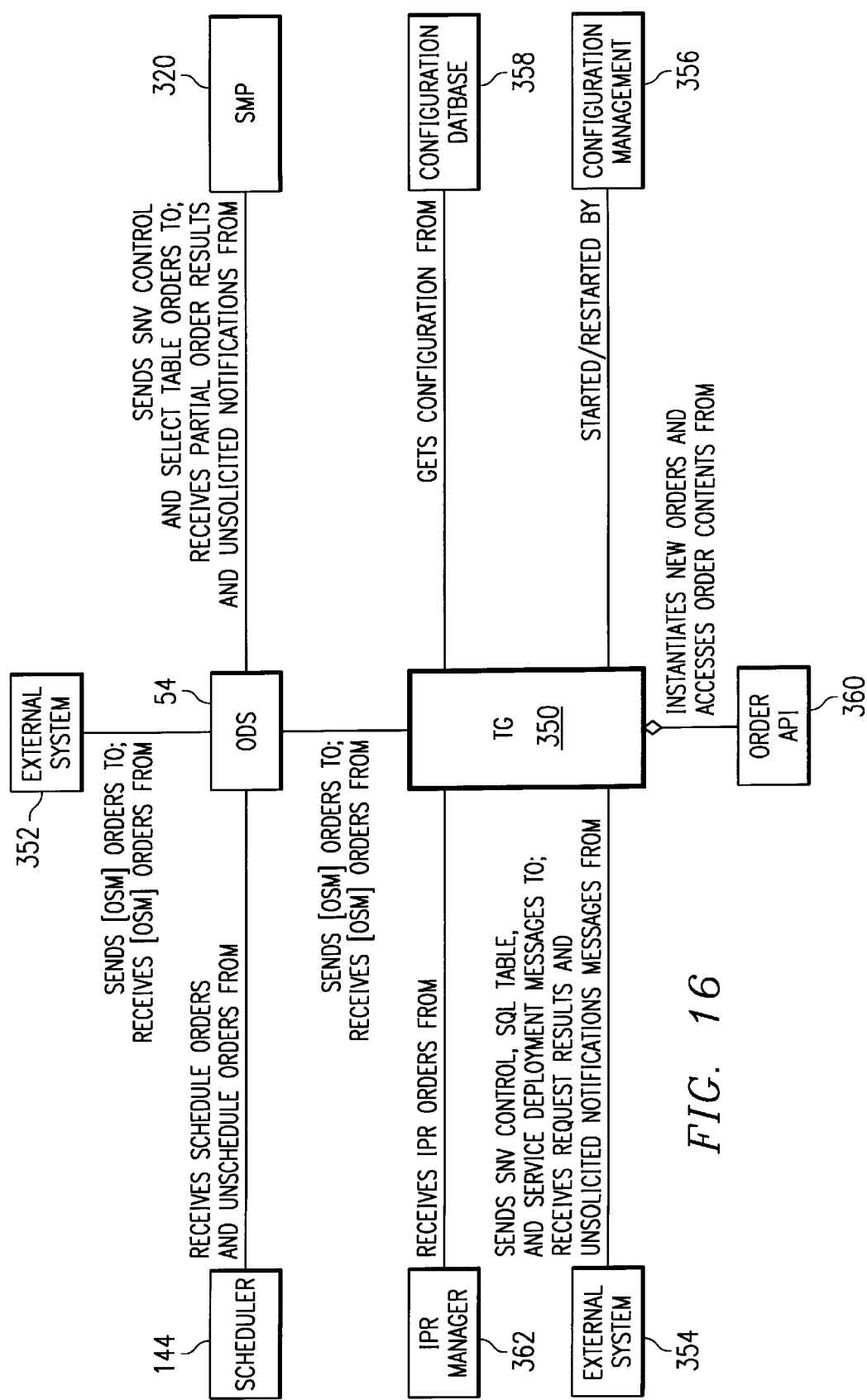
FIG. 16 is a context diagram of an embodiment of translator gateways according to the teachings of the present invention.

FIG. 16 is a context diagram of gateways 52, and in particular, a translator gateway (TG) 350. The majority of external systems 352, such as network nodes, directly access service management system 12 via OSM interface 130 using a pass-through gateway without the need for translation. However, certain external systems 354 which use proprietary interfaces may need to communicate with service management system 12 via a translator gateway 350. For each external system 354 with proprietary interface, a customized translator gateway 350 is used to translate the requests into the OSM format and to translate the response back to the proprietary format. A typical translator gateway 350 resides on service management system 12. However, translator gateways 350 may also reside on the external system or be a stand-alone system. A translator gateway 350 may handle the session layer control when applicable and may supply some syntax checking. Further, translator gateway 350 encodes sufficient information into the translated OSM request message to uniquely identifies the user and connection. This encoded information is then used to route the response messages to the appropriate user. It may be seen in FIG. 16 that translator gateway 350 is started or restarted by a configuration management component 356 and gets its configuration from a configuration database 358. Translator gateway 350 further instantiates new orders and accesses order contents from an order API (application program interface) 360, and sends/receives OSM orders to/from order distribution server 54. Translator gateway 350 further receives IPR orders from an IPR manager 362.

Figure 17:
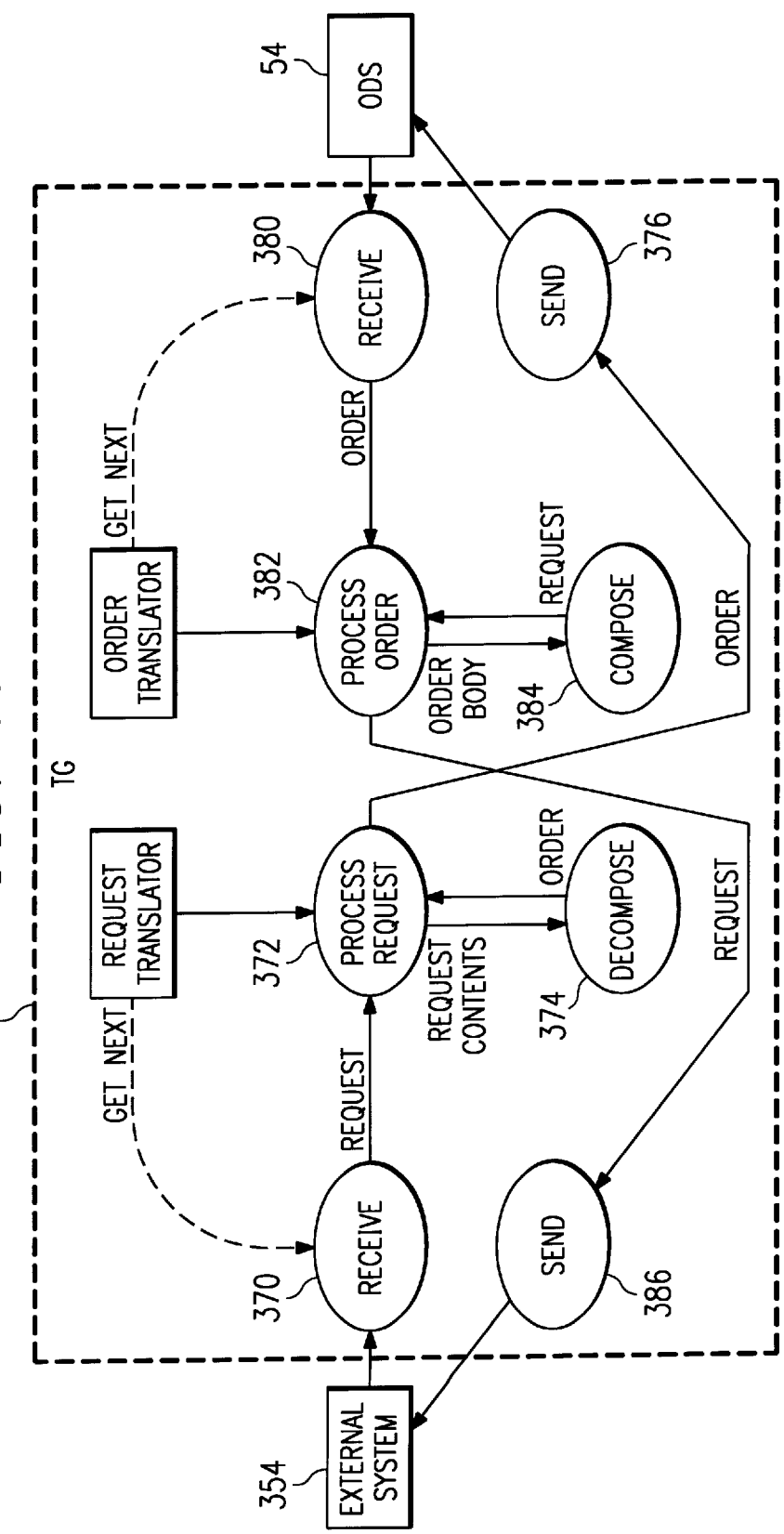
FIG. 17 is a functional model diagram of an embodiment of translator gateways according to the teachings of the present invention.

FIG. 17 is a functional model of translator gateway 350. Translator gateway 350 receives (370) a request in a proprietary format from an external system 354 and processes the request (372). The request from external system 354 is decomposed (374) and put into the format of an order. The order is then sent (376) to order distribution server 54. The flow of messages may also go the other way, with translator gateway 350 receiving (380) an order from order distribution server 54. The order is processed (382) by composing (384) a request in the proprietary format from the order. This request is then sent (386) to external system 354.

Figure 18:
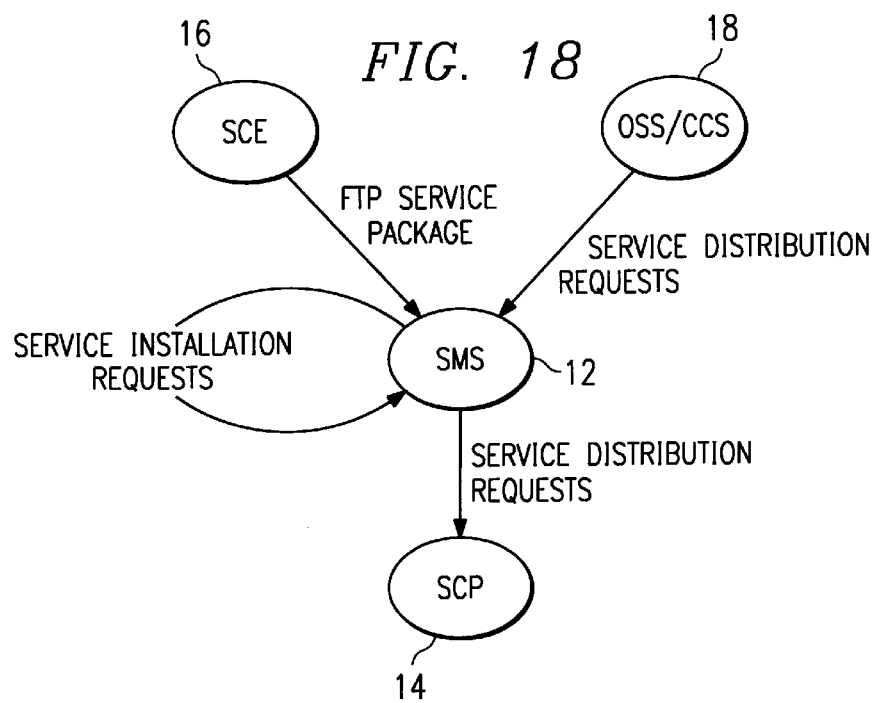
FIG. 18 is a context diagram of an embodiment of service deployment according to the teachings of the present invention.

As described above, services are designed and implemented in the form of service logic programs and database schema in the service creation environment. Further, the service creation environment provides the necessary tools to create, animate, and package services that execute on the service management system. The components of a service that are needed by service management system may include service management programs, service data templates, stored procedures for service management programs, global variables, peg counter files, and graphical user interface definition files. Referring to FIG. 18, the service package which includes these components may be transferred to service management system 12 from service creation environment 16 via file transfer protocol (FTP) pursuant to service installation requests. Operation support system 92, customer care system 18, and service control point 14 may also send service distribution requests to service management system 12 to distribute and manage the distribution of the services to downstream network nodes.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. An service management system for an advanced intelligent network, comprising:
    a plurality of gateways in communications with a plurality of network nodes and service clients which may issue service requests received by the gateways, the gateways operable to receive the service requests from the network nodes and service clients in a variety of dissimilar protocols, the gateways operable to convert the dissimilar protocols of the service requests to orders having a predetermined format containing the service requests;
    an order distribution server in communication with the plurality of gateways operable to receive and distribute the orders;
    a plurality of management programs operable to receive the orders from the order distribution server and execute the service requests contained in the orders, the plurality of management programs operable to generate responses according to the execution of the orders; and
    the order distribution server operable to receive the responses and send the responses to the gateways for delivery to the network nodes and service clients.

2. The service management system, as set forth in claim 1, wherein each order comprises a program key specifying a particular management program for executing the order.

3. The service management system, as set forth in claim 1, wherein each order comprises a destination specifying a particular target for receiving the order.

4. The service management system, as set forth in claim 1, wherein each order comprises a session designation specifying a particular grouping of orders that are to be executed in a particular sequence.

5. The service management system, as set forth in claim 1, wherein each order comprises a state designation specifying a progress state associated with the order.

6. The service management system, as set forth in claim 1, wherein each order comprises an originator designation specifying a network node which the order originated.

7. The service management system, as set forth in claim 1, wherein each order comprises a set of timestamps specifying the time of occurrence of specific events associated with the order.

8. The service management system, as set forth in claim 1, wherein each order comprises a parent designation specifying a parent order which spawned the order.

9. The service management system, as set forth in claim 1, wherein each order comprises a children designation specifying one or more children orders spawned by the order.

10. The service management system, as set forth in claim 1, wherein each order comprises an identifier.

11. The service management system, as set forth in claim 1, wherein each order comprises a set of arguments needed for executing the order.

12. The service management system, as set forth in claim 1, wherein each order distribution server comprises an OSM interface receiving the orders from the gateway.

13. The service management system, as set forth in claim 12, wherein each order distribution server comprises an order inspector receiving the orders from the OSM interface, authenticating the orders, and storing the authenticated orders in an order repository.

14. A service management system for an advanced intelligent network, comprising:
    a plurality of gateways in communications with a plurality of network nodes and service clients which may issue service requests received by the gateways, the gateways converting the service requests to orders having a predetermined format containing the service requests;

an order distribution server in communication with the plurality of gateways receiving and distributing the orders;

a plurality of management programs receiving the orders from the order distribution server and executing the service requests contained in the orders, the plurality of management programs generating responses in response to the execution of orders; and the order distribution server receiving the responses and sending the responses to the gateways for delivery to the network nodes and service clients, wherein each order distribution server comprises an OSM interface receiving the orders from the gateway, wherein each order distribution server comprises an order inspector receiving the orders from the OSM interface, authenticating the orders, and storing the authenticated orders in an order repository, wherein each order distribution server comprises an order scheduler retrieving the orders from the order repository and entering identifiers of the orders in one or more session queues according to session priority.

15. The service management system, as set forth in claim 14, wherein each order distribution server comprises an order dispatcher retrieving the orders from the order repository and dispatching the orders according to its identifier position in the session queue to appropriate management programs.

* * * * *